United States Patent [19]
von Seggern

[11] Patent Number: 4,574,753
[45] Date of Patent: Mar. 11, 1986

[54] METHOD FOR OPERATING A TWO CYCLE ENGINE WITH DYNAMIC STRATIFICATION

[76] Inventor: Ernest A. von Seggern, 1051 E. Angeleno Ave., Burbank, Calif. 91501

[21] Appl. No.: 718,696

[22] Filed: Apr. 1, 1985

Related U.S. Application Data

[60] Division of Ser. No. 522,543, Aug. 10, 1983, Pat. No. 4,543,928, which is a continuation of Ser. No. 159,146, Jun. 13, 1980, abandoned.

[51] Int. Cl.⁴ .................. F02B 19/08; F02B 31/00
[52] U.S. Cl. .................... 123/262; 123/257; 123/277; 123/430
[58] Field of Search ............ 123/257, 260, 262, 263, 123/267, 277, 284, 285, 286, 430

[56] References Cited

U.S. PATENT DOCUMENTS

| | | | |
|---|---|---|---|
| 2,144,561 | 1/1939 | Buchi | 123/262 X |
| 2,658,487 | 11/1953 | Basabe | 123/257 |
| 3,359,958 | 12/1967 | von Seggern et al. | 123/262 X |
| 3,443,552 | 5/1969 | von Seggern et al. | 123/262 |

*Primary Examiner*—W. R. Wolfe
*Attorney, Agent, or Firm*—Edward A. Sokolski

[57] ABSTRACT

A method for operating a two cycle, spark ignition, internal combustion engine of the class having a combustion chamber divided into a relatively small ignition region and a larger combustion region in which the piston reciprocates. Substantially the same stoichiometric fuel-air mixtures are independently supplied to the ignition region in substantially fixed quantities and to the combustion region in variable quantities. These mixtures are compressed simultaneously so that they remain completely separated prior to ignition. The mixtures are stratified with respect to excess air supplied to both regions and to exhaust gases in the engine cylinder, and combustion initiated in the ignition region ignites the variable-sized mixture in the larger region. Burning proceeds from stoichiometric mixtures to lean mixtures as the stratified excess air is mixed into the burning gases. When no fuel is supplied to the combustion region, the ignition region functions independently and burns its fuel efficiently. The exhaust gas recycled in the cylinder acts to stabilize the combustion by retaining heat from cycle to cycle at light load and absorbing heat at heavy load. Stratification is obtained partially by providing separate chambers for the ignition region and the combustion region, but principally the stratification is maintained by means of stable dynamic flow patterns established in said regions.

4 Claims, 9 Drawing Figures

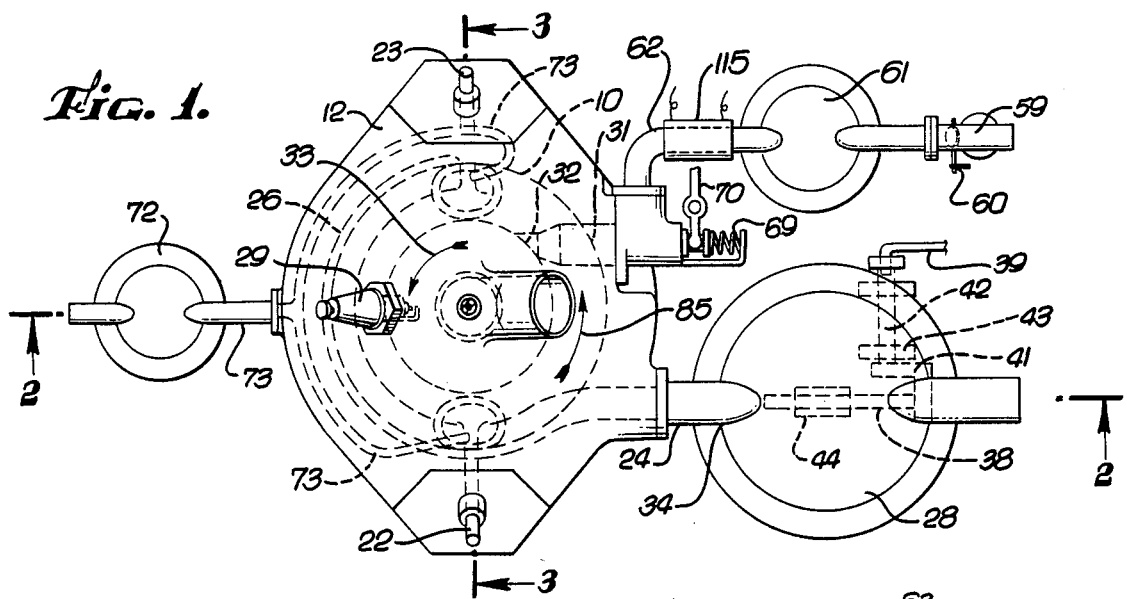
Fig. 1.
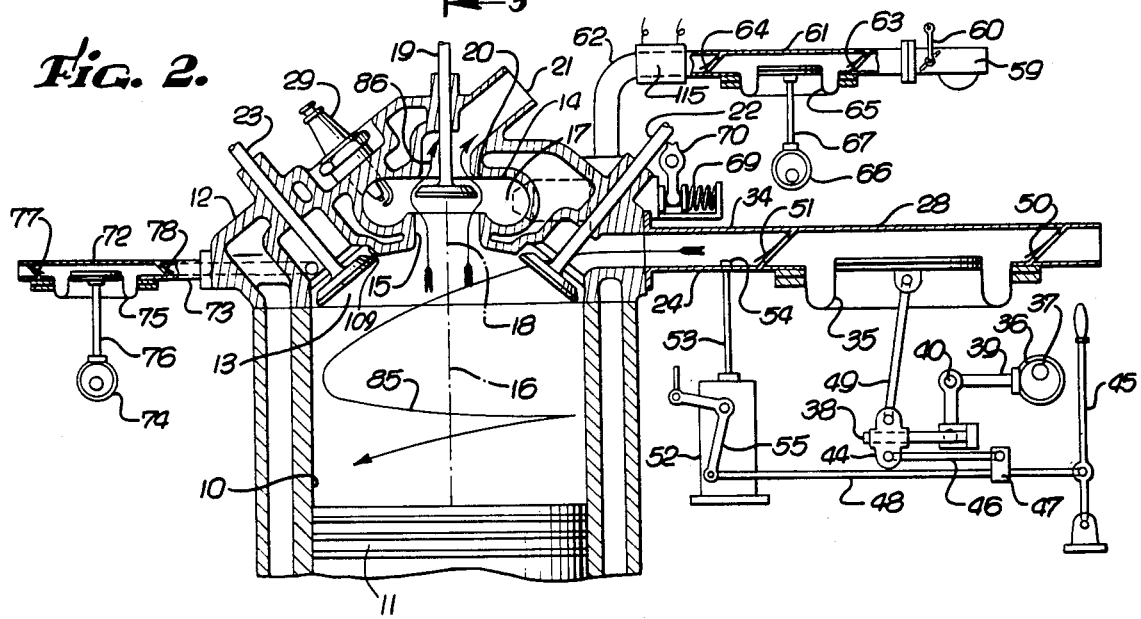
Fig. 2.
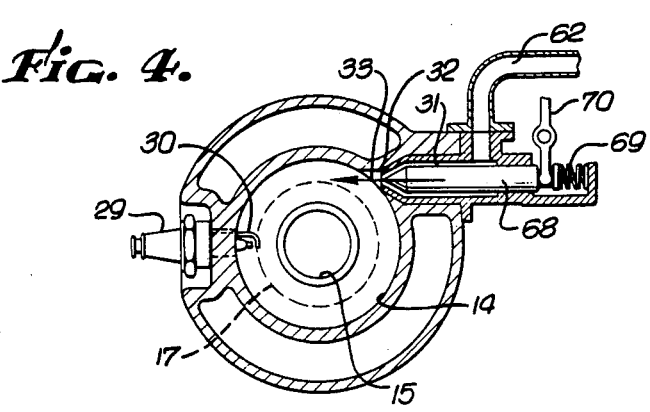
Fig. 4.
Fig. 5.

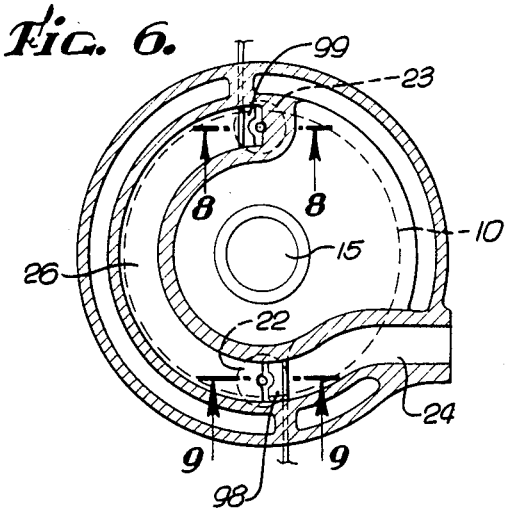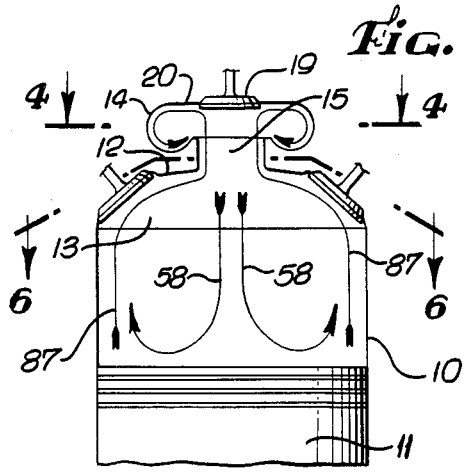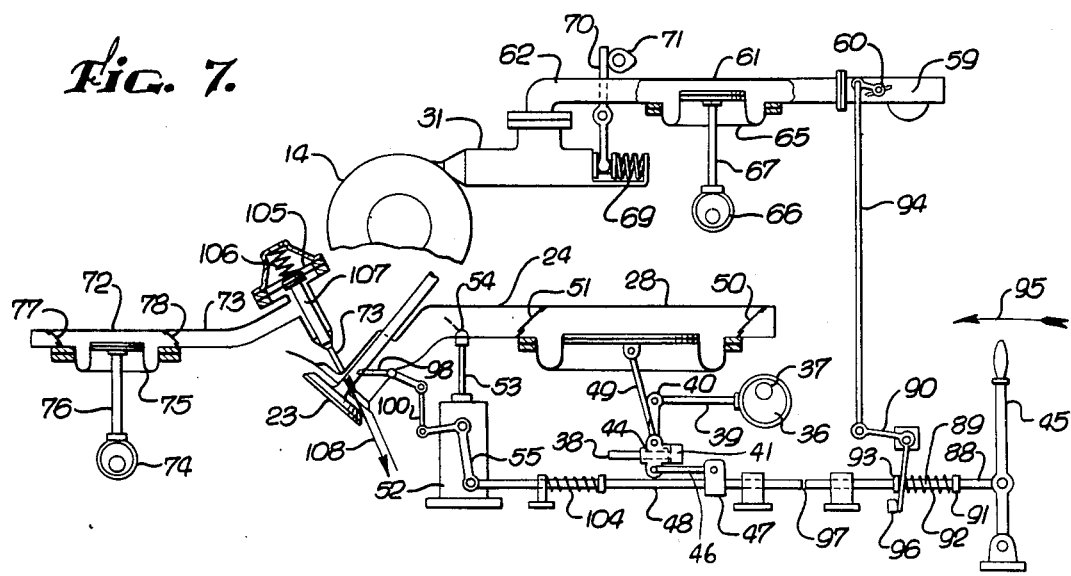

METHOD FOR OPERATING A TWO CYCLE ENGINE WITH DYNAMIC STRATIFICATION

This application is a divisional of my application Ser. No. 522,543, filed Aug. 10, 1983, now U.S. Pat. No. 4,543,928, which in turn, is a continuation of my application Ser. No. 159,146, filed June 13, 1980, now abandoned.

BACKGROUND OF THE INVENTION

1. Field of the Invention

This invention relates to two-cycle, spark ignition, internal combustion engines of the type having a divided combustion chamber.

2. Description of the Prior Art

The two principal attributes of the ideal internal combustion engine are high thermal efficiency and low emissions. However, in both two-and four-cycle engines of conventional design, the presence of unstratified exhaust gas in the combustion chamber interferes with the burning of the fuel-air mixture supplied to the engine and combustion is relatively poor. This problem is particularly acute at idle and light load, and current attempts to reduce the emission of $NO_x$, CO and HC tend to reduce the efficiency to even lower levels than unmodified engines.

It is accordingly an object of this invention to provide an arrangement whereby fuel is burned efficiently in stratified relation to exhaust gas, and stratified excess air is provided to complete the burning process early in the combustion cycle. It will be shown that whereas two-cycle engines in conventional form have been particularly handicapped by excessive emissions, particularly of HC, they can, with proper stratification, avoid this problem, and because of the large quantity of recycled exhaust gas inherent in their operation, can also be low in $NO_x$ emissions. It is accordingly a further object of this invention to provide a two-cycle engine which retains this feature of two-cycle engines and also obtains a fast, efficient and clean combustion under all operating conditions.

SUMMARY OF THE INVENTION

The combustion problems of conventional two-cycle engines cna be solved by providing suitable stratification in the engine. Such stratification is obtained by providing an axial, peripheral circulation in the cylinder having axial exhaust means, and an ignition chamber separate from the combustion chamber. The axial circulation in the cylinder is obtained by introducing working fluid, consisting either of fuel-air mixtures or excess air or both into the cylinder in a peripheral circulation flow about the cylinder axis and simultaneously expelling exhaust gas through exhaust gas outlet means substantially on the axis of the cylinder. The ignition chamber is separate from the engine cylinder, but communicates therewith and a fuel-air mixture is supplied thereto independently of the mixture in the cylinder. This mixture in the ignition chamber is ignited by a spark plug therein and the resulting flame then fires the mixture, if any, in the cylinder. When no mixture is supplied to the cylinder, the engine idles on the localized combustion in the ignition chamber.

An engine constructed in accordance with the invention may include an ignition chamber of the toroidal type connected coaxially to the cylinder, with the axis normal to the plane of the circular toroid, and with the exhaust means (usually a poppet valve) also on the cylinder axis. A spark plug is provided with its electrodes extending substantially to the circular axis of the toroidal cavity and fuel-air mixture supply means are positioned to introduce the mixture tangentially to the circular axis, in the plane of the axis. Whether the fuel is introduced as a pre-mix fuel-air mixture, or as a direct spray injection into air introduced into the ignition chamber, the fuel is introduced during the compression cycle to insure that no fuel will escape into the cylinder prior to its ignition.

An engine constructed in accordance with the invention may also include a sperhical type combustion chamber between the cylinder and the ignition chamber with dual intake valves in said spherical chamber located adjacent the periphery of the cylinder and on opposite sides thereof. Intake manifold means are provided which direct the entering working fluid into the cylinder to rotate therein about the cylinder axis in the same hand of rotation as the rotation of the fuel mixture in the ignition chamber. The intake means may also include variable restrictive means near said valves to control the velocity of the entering working fluid. Phasing means may also be provided to admit air and fuel-air mixtures in sequence to said valves whereby said air and fuel-air mixture may be stratified with respect to each other as well as to the exhaust gas in the cylinder.

The engine as described employs a multiple stratification. There is a division, or stratification, of the fuel supplied to the engine into a separate ignition portion and a variable power portion, a stratification of fuel-air mixture in the cylinder relative to exhaust gas from prior combustion, a stratification of excess air in the cylinder relative to fuel-air mixture and exhaust gas, and a stratification of excess air in the ignition chamber relative to the fuel-air mixture therein. It is important, however, that these stratifications which are necessary to achieve good combustion be provided in a combustion space which has a minimum of surface area. Stratification must be obtained more by dynamic means than by physical separation by confining walls. Flame quenching and high surface scrubbing velocity must be avoided.

The best combustion is obtained when the fuel-air mixture is formed well in advance of ignition, and, in any event, the ignition portion must be kept confined in the ignition chamber prior to ignition especially at light load and idle when there is no additional combustion in the cylinder. Any fuel lost into the exhaust gas in the cylinder prior to ignition burns very poorly, if at all. A non-vacuum cycle such as in a two-cycle engine is essential for retaining a pre-mixed fuel-air mixture within the confines of a small ignition chamber, and this is possible only when the mixture is introduced during the compression cycle against rising pressure in the cylinder. In a vacuum controlled four cycle engine, a mixture introduced into an ignition chamber simply expands throughout the entire combustion space at light loads or idle.

A feature of the two-cycle engine is that, at light loads, a large proportion of hot exhaust gas is recycled from cycle to cycle which retains heat in the cylinder to promote the combustion of the small quantity of fuel burned in the ignition chamber. As the efficiency at light load and idle is improved, the heat rejection becomes less so that the recycled heat is essential to maintain a proper operating temperature. On the other hand, under heavily loaded operation, the exhaust gas acts as a heat sink and is effective in limiting the temperature rise to levels below that at which $NO_x$ is formed. This dual action gives rise to a stabilized conbustion which cannot be obtained in a four-cycle engine.

A further feature of the two-cycle engine of this invention is that it operates on a full pressure cycle and does not waste the energy associated with throttled control as in a four cycle engine. This makes the engine "free running" and improves the part load efficiency still further. A variable output air pump is provided which does not employ throttling and furnishes air for the variable power mixture in the cylinder. Only the small mixture for the ignition chamber is throttled to provide a stable idling performance without the use of a mechanical governor and this represents a negligible energy loss.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a plan view of an illustrative engine showing the position of the intake and exhaust valves, the ignition chamber, the intake and exhaust passages, the two fuel-air mixture pumps and the excess air pump;

FIG. 2 is a vertical longitudinal section of the engine, taken along the line 2—2 of FIG. 1, showing the intake and exhaust valves in open positions during the charging and scavenging cycle, and cross sections of the two mixture pumps and the excess air pump;

FIG. 3 is a diagrammatic vertical section taken along the line 3—3 of FIG. 1 showing the gas flow lines during compression and expansion;

FIG. 4 is a horizontal section of the ignition chamber taken alon the line 4—4 of FIG. 3, showing the mixture inlet valve for the ignition chamber;

FIG. 5 is a diagram showing the phasing of the compression, power and exhaust cycles and the charging cycles for the cylinder mixture, the ignition chamber mixture, and the excess air;

FIG. 6 is a horizontal section of the intake manifold taken along the line 6—6 of FIG. 3 showing the mixture velocity control valves above the intake valves;

FIG. 7 is a diagrammatic illustration of the control mechanism for varying the power of the engine;

FIG. 8 is a vertical cross section of the second intake valve taken along the line 8—8 of FIG. 6; and FIG. 9 is a vertical cross section of the first intake valve taken along the line 9—9 of FIG. 6.

DESCRIPTION OF THE PREFERRED EMBODIMENT

An illustrative engine embodying the invention shown in FIGS. 1 to 9 of the drawings, has a single water-cooled cylinder and is of the two-cycle type, but it will be understood that the invention can also be employed in connection with air cooled engines and multiple cylinder engines as well. The engine includes a cylinder 10 with a piston 11 reciprocable therein. A cylinder head 12 fastened to the top of the cylinder 10 defines a combustion chamber 13 therein, shown in a somewhat flattened hemispherical form, and a toroidally shaped ignition chamber 14 located directly above the combustion chamber. The ignition chamber 14 communicates with the combustion chamber 13 through a short passage 15 that is coaxial with the cylinder axis 16 and the circular axis 17 of the torodial ignition chamber is normal to the axis 18 of said passage. An exhaust valve 19 is fitted in the top 20 of the ignition chamber 14, in substantial alignment with the cylinder axis 16, and communicates with an exhaust manifold 21. Two intake valves 22 and 23 are fitted, one on each side of the ignition chamber, with their stems inclined from the cylinder axis by approximately 40 degrees to blend the valves into the spherical sidewalls of the combustion chamber. The valves 22 and 23 are operated in the usual manner by a valve gear (not shown) and timed in a sequence to be described.

The intake manifold 24 joins the intake valve 22, as shown in FIG. 9, where it is divided into a downward branch 25 and a horizontal extension 26 which joins the intake valve 23 in a similar downward passage 27 shown in FIG. 8. An air pump 28, which may be of the diaphragm type, is joined to the end of the manifold 24 and supplies the air to form a fuel-air mixture of the engine cylinder.

The toroidal ignition chamber 14 has a spark plug 29 with electrodes 30 extending inwardly approximately to the circular axis 17. An inlet valve 31, which joins the ignition chamber 14 tangentially at point 32, is of an inverted poppet type which opens outwardly rather than inwardly and acts to concentrate the flow through the valve. As shown by arrow 33, the flow through the valve 31 into the ignition chamber 14 converges into a narrow stream which circulates around the torodial cavity in a plane normal to the cylinder axis 16. This pattern is effective in keeping the gas stream confined to the ignition chamber 14 during the compression stroke.

The engine has three distinct supply units, one for the cylinder 10, one for the ignition chamber 14, and one for excess air. The cylinder supply unit has the output port 34 of its air pump 28 connected to an extension of the intake manifold 24. This pump 28 is of the variable output type having a diaphragm 35 and a variable stroke mechanism which includes an eccentric 36 attached to the crankshaft 37 of the engine to drive the rod 38 by means of a link 39 which is pivoted at location 40. The rod 38 is connected to a bent arm 41, shown in FIG. 1, to a pivot shaft 42 supported by bearings 43 and carries a slidable member 44 which can be moved by means of a control lever 45 and a connecting link 46 acting through a pivot block 47 supported by a rod 48. A second link 49, pivotally connected to a slider 44 and a diaphragm 35, drives the diaphragm 35 with a variable amplitude from zero when the slider 44 is in alignment with the pivot 42, as shown in FIG. 7, to a maximum, when in a non-aligned position shown in FIG. 2.

An inwardly opening check valve 50, of the reed type admits air to the pump 28 when the diaphragm 35 moves down, as shown, and it closes on the upstroke to discharge the air through a discharge valve 51 to the cylinder 10 when valves 22 ansd 23 are open. A variable output fuel pump of any conventional type 52 is provided which delivers fuel to the manifold 24 through a line 53 and a nozzle 54. An output control lever 55 is connected by a rod 48 to the control lever 45 so that the fuel output and the air pump 28 are simultaneously controlled and coordinated so as to provide a substantially stoichiometric fuel-air mixture in a variable amount to the engine at all speeds and loads. This mechanism is shown in FIG. 2.

The fuel-air mixture supply unit for the ignition chamber 14 is shown using a conventional carburetor 59 with a throttle control 60 in combination with a diaphragm type pump 61 which is connected by a manifold 62 to the inlet valve 31. The pump 61 has inlet and discharge valves 63 and 64, respectively, and a diaphragm 65 driven by an eccentric 66 and a link 67 at crankshaft speeds. A movable pintle valve stem 68, shown in FIG. 4, is held closed against the cylinder pressure by a spring 69 and is opened by a rocker arm 70 and a cam 71 in the usual manner. The phasing of these units will be described later.

Because the energy loss associated with throttle control 60 is small for the ignition chamber charge of mixture, it is used to give a stable idle performance without the use of a mechanical governor. It will be evident that the carburetor 59 could be replaced by fuel injection into the manifold 62 in combination with a venturi mixture control.

The excess air supply unit for the cylinder 10 uses a separate pump 72 of the diaphragm type and a manifold 73 which joins the intake manifold portions 25 and 27 very close to the intake valves 22 and 23, as shown in FIGS. 8 and 9. An eccentric 74 driven at crankshaft speed operates a diaphragm 75 by means of a link 76 at a fixed stroke. This unit is provided with a conventional inlet valve 77 and a spring loaded discharge valve 78 which is designed to open only after the diaphragm 75 is driven up enough to develop a pressure in the manifold 73 which exceeds any pressure developed in the intake manifold 24 by the air pump 28. The pump 72 is phased with respect to the opening and closing of the intake valves 22 and 23 in such a manner that the opening of the valve 78 occurs shortly after said intake valves open. Consequently, a fixed amount of air enters the cylinder 10 in a high velocity pulse, just after the said valves open, and independently of the amount of mixture which may enter the cylinder from the pump 28.

At idle and light load when the engine operates on the ignition chamber 14 alone, only the excess air enters the cylinder 19. However, as the load is increased, the air dilutes the first portion of the fuel-air mixture entering the cylinder to make a stratified lean portion of decreasing leanness as load increases. Under well loaded operation when a substantial portion of the exhaust gas in the cylinder is displaced by the mixture, the excess air is no longer so essential for good combustion. It will be understood that the exact time of air introduction with respect to the opening of the intake valves 22 and 23 is not critical but may be varied from the beginning to the end of the charging cycle.

The phasing of the three supply units relative to the engine cycle is shown in FIG. 5. The power cycle, after ignition near TDC, extends for about 120 degrees as shown by an arc 79. Then the exhaust valve 19 opens for an interval 80. Shortly after the exhaust valve 19 opens, the intake valves 22 and 23 open for an interval 81, closing shortly after the exhaust valve closes and slightly after BDC. During this interval, the main mixture pump 28 may deliver the fuel mixture to the cylinder 10. During an interval 82 the excess air delivered by the air pump 72 may enter the engine at the beginning of interval 81. Then, as soon as intake valves 22 and 23 close, the ignition chamber mixture inlet valve 31 opens and supplies the mixture to the ignition chamber 14 during an interval 83. This occurs simultaneously with the beginning of the compression cycle indicated by an arc 84.

The engine has two distinct modes of operation, i.e., one at idle and light load when fuel is delivered only to the ignition chamber 14, and the other when fuel is delivered to both the ignition chamber and the cylinder 10. The excess air pump 72 delivers air to the cylinder 10 in a uniform amount in both modes of operation although this may be varied, if desired.

The initial control of the engine is by means of the throttle 60 of the carburetor 59 and it varies the amount of fuel-air mixture delivered to the ignition chamber 14 by the mixture pump 61. The arrow 33 indicates how the mixture flow converges into a narrow stream as it passes through the inlet valve 31 and circulates in the ignition chamber 14 generally along the line of the circular axis 17, shown in FIG. 4. Just after the intake valves 22 and 23 open, the air supply unit 72 delivers air to the cylinder 10 through the valves 22 and 23 in a stream indicated generally by an arrow 85 which spirals down in the cylinder 10 adjacent its periphery and displaces an equal amount of exhaust gas from the cylinder through the exhaust valve 19. This outflow is indicated generally by arrows 86. During the subsequent compression cycle, the piston 11 drives the peripherally circulating air upwardly as shown by arrows 87 in FIG. 3. For clarity, the flow is shown going straight up the cylinder walls, but it is understood that the circulation around the cylinder axis persists throughout the subsequent flow giving a spiral flow to the air.

As the flow passes upwardly through the connecting passage 15 into the ignition chamber 14, the air moves along the walls like a laminar flow through a funnel and then turns outwardly and around the toroidal chamber walls. This circulation encloses the mixture flow 33 which began just after the intake valves 22 and 23 closed and keeps the mixture positioned substantially along the circular torodial axis 17. The spark plug electrodes 30 extend substantially to this axis also, to insure good ignition in a confined and low velocity region substantially devoid of exhaust gas and surrounded by excess air. This dynamically stable flow of the air in the cylinder 10 and ignition chamber 14 acts to shield the fuel-air mixture from the residual exhaust gases in the cylinder 10 up to the time of ignition. Then, when combustion is initiated, the burning mixture expands into the excess air to promote a fast and complete combustion uninhibited by the exhaust gas in the cylinder 10.

Under loaded operation the ignition flame acts to ignite the fuel-air mixture in the cylinder 10 and the path of the ignition flame is shown generally by arrows 58 in FIG. 3. The piston 11 is near the top of its stroke when ignition occurs and the ignition flame passes down the passage 15 and spreads radially outward on the piston top to circulate in a toroidal manner in the combustion chamber 13. FIG. 3 shows the piston 11 at the beginning of the compression stroke. The circulation is generally as shown by the arrow 58, but is initially only in the combustion chamber 13. This flow pattern gives good ignition to the mixture in the combustion chamber 13 which is circulated about the cylinder axis in direction essentially normal to the flame path.

The exhaust gas retained in the cylinder 10 under idle and partly loaded operation is useful in several ways, when properly stratified so as not to interfere with the combustion of the fuel. When the engine is idling or operating at light load with combustion principally in the ignition chamber 14, the exhaust gas carries over heat from the prior cycle and tends to keep the temperature relatively high, since the heat released from the small idle combustion charge is very small. The recycled exhaust gas is also useful because it makes possible the elimination of pumping losses associated with throttled charges in the cylinder 10, and also because of its density, makes it possible to hold the ignition fuel-air mixture together in the small confines of the ignition chamber 14 during the compression cycle. It has also been noted that the exhaust gas acts as a heat sink under loaded conditions and reduces the formation of $NO_x$ by keeping peak combustion temperatures down.

It should be noted also that the isolation or stratification of the small ignition fuel-air mixture has been achieved with a minimum of confining walls and a maximum of dynamic force due to stable circulation patterns. The communication between the ignition chamber 14 and the combustion chamber 13 is very large even though the stratification is very good. An "open" design is essential for low heat loss to the walls and high speed and efficient operation.

The quantity of fuel-air mixture delivered to the ignition chamber 14 varies from the minimum quantity required to idle the engine to the maximum quantity the ignition chamber will hold without loss to the cylinder 10 during compression. The maximum power output from the ignition chamber 14 alone will drive a car in moderate "cruise" operation.

A schematic diagram of the control mechanism is shown in FIG. 7. This mechanism coordinates the operation of the fuel and air supply means for the ignition chamber 14 and the cylinder 10- in sequence as described. The control lever 45 actuates a rod 88 which passes loosely through a hole 89 in bel-crank 90. A collar 91 fastened to the rod 88 holds a spring 92 against the bel-crank 90 and presses it against a collar 93 also fastened to the rod. The bel-crank 90 is connected to the throttle 60 of the carburetor 59 by a link 94 and acts to open the throttle when the lever 45 is moved to the left, as shown by an arrow 95. A stop 96 is place so that it engages the bel-crank 90 when the throttle 60 is fully opened, and further movement of the lever 45 to the left only compresses the spring 92. At the point where the bel-crank 90 engages said stop, the end of the rod 88 engages the end of the rod 48 at 97 and actuates the variable stroke mechanism of the air pump 28 and the output of fuel pump 52 as already described. In addition, the bel-crank 55 of the fuel pump 52 opens the valve 98 in the passage 25 (and the valve 99 in the passage 27 also) by means of a line 100.

A valve 98, shown in FIG. 9, is in the form of a vane, pivoted at 101 adjacent the side wall 102 of the passage 25 opposite the valve stem 103 of the intake valve 22 (also the same of the valve 23) which acts to vary the cross-sectional area of the passage in proportion to the fuel-air mixture provided by the pump 28 in a manner that maintains a substantially uniform flow velocity of said mixture into the cylinder 10 independently of the amount put in. This maintains the circulating flow in the cylinder 10, shown generally by the arrow 85, at a high velocity and in the same hand of rotation as the excess air put into the cylinder by the air pump 72. This circulation is important because it keeps the mixture and the excess air stratified with respect to the residual exhaust gas and enables the inflowing air and mixture (if any) to displace an equal amount of exhaust gas out of the cylinder 10 without losing part of the mixture through the exhaust valve 19 in the process. A compression spring 104 is provided to cut off the delivery of fuel air mixture to the cylinder 10 when the lever 45 is moved to the right.

An alternate form of discharge valve for the excess air pump 72 is shown in FIG. 7. It is of the diaphragm operated pintle valve type. The diaphragm 105 is acted on by air discharged from the pump 72 and is lifted when the pressure compresses the spring 106. This opens the conical pintle valve 107 and a high velocity, converging air stream 108 enters the cylinder and follows generally the flow path 85. It will be evident that the valve, in place of being pressure operated, could be lifted by mechanical or electrical means at a predetermined time so that the air enters the cylinder 10 at high velocity when the intake valves 22 and 23 are opened.

A further improvement in means for maintaining separation of the air and fuel-air mixture entering the cylinder relative to the residual exhaust gas therein is made by partially recessing the intake valves 22 and 23 in the combustion chamber 13 next to the central opening 15 into the ignition chamber 14. This is obtained by flattening the upper part of the spherical combustion chamber 13, as shown in FIG. 2, and inclining the valves 22 and 23 so that the inner side of the valve seat next to the passage 15 becomes recessed. This provide a curved wall 109 which acts to deflect the entering air and mixture tangentially into the cylinder 10 and away from the exhaust gases leaving the cylinder through the passage 15.

Since establishing a peripheral circulation in the cylinder 10 of the fuel-air mixture is an important part of insuring the best possible stratification in the cylinder, a special design of the intake manifold, as shown in FIGS. 8 and 9 is provided. Two intake valves 22 and 23 are used to produce a couple that is effective in making the flow more uniform than can be obtained with a single valve, and a laminar, non-turbulent flow is obtained by having the flow pass down passages 25 and 27 parallel to the valve stems 103 and 110 and fan out across the back sides 111 and 112 of the valves 22 and 23. These flows are shown by arrows 113 and 114. This construction avoids the difficulty of having the flow split around the valve stems creating turbulence which spoils the flow pattern. The small excess air flow stream indicated by arrow 108 in FIG. 7 is directed to one side of the valve stem for the same reason.

The three air supply pumps shown are of the diaphragm type, but are illustrative only. Any type of pump may be used, but the volume output control of the large cylinder mixture supply means should avoid the energy loss associated with throttle control.

As an example of an engine which has operated according to the invention described, the displacement may be about 21 cubic inches, the compression ratio 8 to 1, and the capacity of the ignition chamber 14 about ¼th that of the main combustion chamber 13. These dimensions and ratios are not limitations on the scope of the invention, but merely set forth the parameters of one engine constructed as set forth above that embodies the invention. In the embodiment illustrated, the engine has no cylinder ports, as in conventional two-cycle engines, but has poppet valves for both intake and exhaust means, and may have a conventional closed crankcase with oil as in the usual four-cycle engine practice.

Because of the high thermal efficiency of the engine, especially at light load, the engine may require auxiliary heat to maintain itself in a sufficiently warm operating temperature in cold weather. A heater 115 may be provided for the intake manifold 62 to help vaporize the fuel supplied to the ignition chamber 14. This may be heated electrically from the engine's electric system or by an auxiliary combustion in a gasoline fired heater.

While the two-cycle engine described is a preferred form of the engine, it is understood that most of the features illustrated and described may also be applied to four-cycle engines. This is desirable for high speed engines as it provides more time for the introduction of the new working fluid. The principle modification of normal four-cycle practice is a change in the exhaust valve timing. Instead of closing the valve at the end of the exhaust cycle, the valve is held open during the entire exhaust and intake cycle, so that if nothing is added to the cylinder, the exhaust gas simply moves out into the exhaust manifold and is then drawn back into the cylinder again. On the other hand, if a full charge or working fluid is pumped into the cylinder during the intake cycle, the exhaust does not re-enter. A part load operation, it is desirable to introduce the working fluid in a pulsed flow which terminates at the end of the intake cycle, but has a variable beginning, the time depending on the quantity of working fluid introduced. The rate of flow should match the displacement of the piston. In this manner the exhaust gas and new working fluid do not enter the cylinder at the same time to become mixed together. There is no vacuum cycle and the control and operation of the engine is basically the same as in the two-cycle design.

It is possible to utilize the intake cycle of the four cycle engine for introducing the new working fluid even though the customary vacuum, cycle is not used. The modified exhaust valve timing is utilized as above, which means that during the intake cycle both the intake and exhaust valves are held open, but in order to determine what enters the cylinder a pair of auxiliary, light, fast acting valves are provided adjacent the intake and exhaust valves, just outside of the cylinder. For no load operation, the auxiliary intake valve is held closed, and only exhaust gas is taken into the cylinder, while at full load the auxiliary exhaust valve is held closed and only new working fluid is taken in. The auxiliary valves are coordinated so that when one is open the other is closed. For intermediate loads, the positions of the two valves are reversed during the intake cycle, so that some exhaust gas is taken in at the beginning of the cycle, and then working fluid is taken in toward the end of the intake cycle. To control the power of the engine, the time of valve reversal is varied from the beginning to the end of the intake cycle, and this varies the quantity of working fluid taken into the cylindesr without operating with a vacuum therein. The fuel supply means does not include a throttle.

It is understood that the engine is not limited to the precise structure shown, but also includes such modifications as may be embraced within the scope of the appended claims.

I claim:

1. In an internal combustion engine, a method for stratifying exhaust gas, excess air and fuel-air mixture in the combustion space of said engine, comprising the steps of:
   directing a body of the exhaust gas so that it flows linearly along a predetermined linear axis;
   directing a body of air so that it circulates around said body of exhaust gas in an enclosing spiral flow;
   directing a body of the fuel-air mixture to flow in a circular path around said exhaust gas and body of air in the form of a toroidal body coaxial with said exhaust gas and with its circular axis normal to said predetermined linear axis; and
   directing at least a portion of said enclosing body of air to spread out radially and flow around said fuel-air mixture in a spiral flow that encloses said fuel-air mixture and separates it from said exhaust gas;
   whereby said exhaust gas, air, and fuel-air mixture are separated from each other in a dynamic triple stratification.

2. With regard to an internal combustion engine of the spark ignition type having a cylinder, a piston, a combustion chamber substantially co-axial with said cylinder, fuel-air mixture intake menas opening tangentially into said cylinder adjacent the periphery of said cylinder, a separate ignition chamber in the form of a toroidal cavity connected to said combustion chamber by a passage normal to the circular axis of said toroid and co-axial with the axis of revolution of said toroid and also co-axial with the cylinder axis, second fuel-air mixture menas, and exhaust expulsion means substantially on the axis of said cylinder and opening into said ignition chamber, a method of charging said combustion chamber and said ignition chamber with fuel-air mixtures and igniting said mixtures comprising the steps of:
   directing a first fuel-air mixture tangentially into said cylinder through said intake means to establish a subustantial rotational velocity of said mixture inside said cylinder about said cylinder axis while displacing exhaust gas in said cylinder from a previous cycle of operation through said axially positioned exhaust expulsion means in a linear flow;
   compressing said first fuel-air mixture-into said combustion chamber while concurrently charging said ignition chamber with a second fuel-air mixture, said second fuel-air mixture being directed into said ignition chamber in a converging stream which rotates circularly therein about the linear exhaust gas flow and along the toroidal circular axis of said ignition chamber in the same hand of rotation as the first fuel-air mixture; and
   igniting said second fuel-air mixture in said ignition chamber and directing a resulting flame axially into said combustion chamber in a flow which spreads radially outwardly and circulates toroidally therein substantially normal to an initial axial flow established in the cylinder to ignite the first fuel-air mixture therein.

3. With regard to an internal combustion engine of the spark ignition type hving a cylinder, a piston, a combustion chamber substantially co-axial with said cylinder, working fluid intake means opening tangentially into said cyilnder adjacent the periphery of said cylinder, a separate ignition chamber in the form of a toroidal cavity connected to said combustion chamber by a passage whose axis is normal to and co-axial with the circular axis of said toroidal cavity and also co-axial with the cylinder axis, and exhaust expulsion means substantially on the axis of said cylinder and opening into said ignition chamber by said combustion chamber passage, a method of charging the ignition chamber with a fuel-air mixture and stratified excess air and igniting said mixture comprising the steps of:
   directing excess air and a first fuel-air mixture in independent and stratified bodies into said cylinder through said working fluid intake means to establish a substantial circulation velocity inside said cylinder while displacing exhaust gas from a previous cycle through said exhaust expulsion means in a liner flow;

subsequently compressing said excess air into said ignition chamber in a flow which spreads radially outwardly and circulates around the circular toroidal axis in a spiral flow;

concurrently introducing a second fuel-air mixture into said ignition chamber along said circular toroidal axis inside said spiral flow of excess air, whereby said excess air circulates around said second fuel-air mixture in a stratified relation thereto; and igniting said fuel-air mixture at a point substantially on said circular toroidal axis.

4. In an internal combustion engine of the spark ignition type having a toroidal ignition chamber with a circular axis and a normal axis through the center, which is a coaxial with inlet and outlet linear passages in communication with the toroidal chamber along the inner wall thereof, a method for stratifying relative to each other exhaust gases, air and a fuel-air mixture contained in said chamber comprising the steps of:

directing the exhaust gases linearly through said linear outlet passage;

directing a circulating stream of air around said exhaust gases which encloses said exhaust gases and flows in a spiral flow in the direction of the exhaust gases, at least a part of said air entering said toroidal chamber and circulating around the circular axis of said toroidal chamber in a direction substantially normal to said circular axis; and directing a stream of said fuel-air mixture so as to enter said toroidal chamber through a tangentially positioned passage in the plane of the circular axis and circulate therein substantially along said circular axis and inside of the circulating are stream;

whereby said fuel-air mixture is isolated from said exhaust gases and said air in a triple stratification.

* * * * *